US007318629B1

(12) United States Patent
Sun et al.

(10) Patent No.: US 7,318,629 B1
(45) Date of Patent: Jan. 15, 2008

(54) STEER BY BRAKE CONTROL SYSTEM

(75) Inventors: Qiong Sun, Farmington Hills, MI (US); Eric Schieb, Duluth, GA (US); David W. Weber, South Lyon, MI (US); Frank Lubischer, Novi, MI (US)

(73) Assignee: Kelsey-Hayes Company, Livonia, MI (US)

( * ) Notice: Subject to any disclaimer, the term of this patent is extended or adjusted under 35 U.S.C. 154(b) by 295 days.

(21) Appl. No.: 11/127,393

(22) Filed: May 12, 2005

(51) Int. Cl.
*B60T 8/60* (2006.01)

(52) U.S. Cl. .................. 303/146; 303/191; 701/41

(58) Field of Classification Search ............... 303/146; 1/191; 701/41, 48, 53, 93; 180/244
See application file for complete search history.

(56) References Cited

U.S. PATENT DOCUMENTS

| | | | |
|---|---|---|---|
| 4,931,930 A * | 6/1990 | Shyu et al. ............ | 701/36 |
| 5,762,406 A | 6/1998 | Yasui et al. | |
| 6,021,367 A * | 2/2000 | Pilutti et al. .......... | 701/41 |
| 6,059,383 A * | 5/2000 | Paggi et al. .......... | 303/190 |
| 6,219,610 B1 | 4/2001 | Araki | |
| 6,612,394 B2 | 9/2003 | Wessman | |
| 6,786,296 B2 | 9/2004 | Guldner et al. | |
| 2005/0206231 A1* | 9/2005 | Tseng et al. ......... | 303/146 |

* cited by examiner

*Primary Examiner*—Bradley King
(74) *Attorney, Agent, or Firm*—MacMillan, Sobanski & Todd, LLC (57) ABSTRACT

A turn control system is provided having four wheels and a steering wheel that controls the vehicle steering. A steering wheel angle sensor senses an angle of rotation of the steering wheel. An acceleration sensing device senses an acceleration demand. A wheel speed sensing device senses a wheel speed for each of the four wheels. A turn control activation switch enables the turn control system and shifts a vehicle transmission to one of a low or reverse operating gear. A brake control module calculates a target vehicle speed, a vehicle turning geometry, and target wheel speeds. A braking torque command signal is generated for modulating the brake torque. An engine torque command signal is generated for modulating an engine torque for producing the target vehicle speed. A respective additional braking torque is applied to at least one of the wheels for reducing the vehicle turning radius while maintaining the vehicle target speed.

17 Claims, 5 Drawing Sheets

STEER BY BRAKE CONTROL SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates in general to steering by braking systems, and more specifically, to steering by braking utilizing a constant speed velocity control system.

2. Description of the Related Art

Conventional steering systems typically include a steering wheel coupled to a steering column input shaft that is mechanically coupled to a rack in a rack and pinion steering system. The rack and pinion steering system receives the steering input command from the steering wheel for providing a pivoting force on the steerable wheels. Typically the front wheels of a vehicle are steerable whereas the rear wheels are not.

The conventional steering system will have a maximum steering wheel angle which, given a respective speed at which he vehicle is traveling, will produce a respective turn radius for this maximum steering wheel angle. To achieve a smaller turn radius beyond that which a conventional steering system can provide, steering systems have been known to include four steerable wheels. A vehicle having four steerable wheels will generate a smaller vehicle turning radius than a vehicle having two steerable wheels for a given speed and steering wheel angle. However, such four-wheel steerable systems are costly since additional hardware is required to allow the rear wheels to become steerable.

Other systems have utilized steer by braking systems to generate a smaller turn radius than a conventional steering system. Such systems typically reduce the turn radius by braking a respective inside wheel. However, utilizing braking systems where the speed is varying during the braking process makes it difficult to establish or predict the turning radius. A variable increase/decrease in the vehicle speed will variably increase/decrease the vehicle turn radius as the speed of the vehicle variably changes. Steer by brake systems provide a driver with a reduction in vehicle's turning radius. This concept typically includes braking one or more wheels.

SUMMARY OF THE INVENTION

The present invention has the advantage of reducing the turn radius of a vehicle when making a slow turn maneuver by applying a braking force to a respective inside vehicle wheel. The present invention further applies a control speed algorithm for maintaining a constant speed through the turn so that a constant reduced turn radius may be maintained without a driver having to manipulate between the accelerator pedal and the brake pedal.

In one aspect of the present invention, a turn control system is provided having four wheels and a steering wheel that controls the steering of two of the wheels. A brake system has four brakes with each of the brakes capable of applying an individual brake torque to a respective one of the four wheels. A steering wheel angle sensor senses an angle of rotation of the steering wheel. An acceleration sensing device senses an acceleration demand. A wheel speed sensing device senses a wheel speed for each of the four wheels. A turn control activation switch that enables said turn control system and shifts a vehicle transmission to one of a low or reverse operating gear. A brake control module calculates a target vehicle speed in response to the acceleration demand, a vehicle turning geometry in response to an angle of the steering wheel, target wheel speeds for each of the wheels in response to the target vehicle speed and the vehicle turning geometry. A braking torque command signal is generated for modulating the brake torque on the four brakes. An engine torque command signal is generated for modulating an engine torque for producing the target vehicle speed. A respective additional braking torque is applied to at least one of the brakes for reducing the vehicle turning radius while maintaining the vehicle target speed.

DETAILED DESCRIPTION OF PREFERRED EMBODIMENTS

Figure 1:
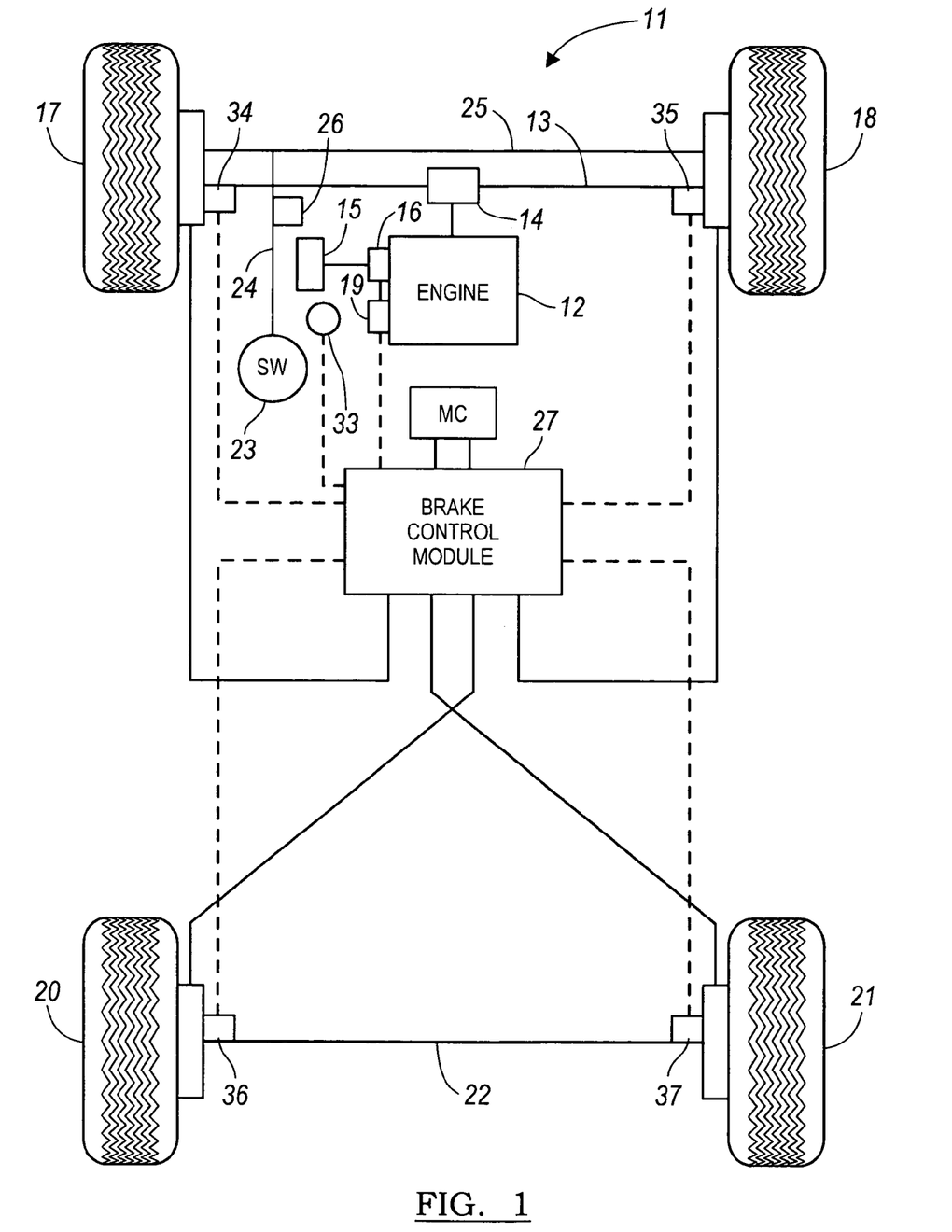
FIG. 1 is a schematic view of a front wheel drive vehicle according to a first preferred embodiment of the present invention.

FIG. 1 illustrating a front wheel drive vehicle 11 according to a preferred embodiment of the present invention. The vehicle 11 includes an engine 12 that is coupled to front axles 13 via a transaxle 14. An accelerator pedal 15 provides an acceleration pedal demand signal to a throttle 16 of the engine 12. The throttle 16 controls the amount of air flow to the engine 12 for outputting a desired engine torque for driving the front left wheel 17 and the front right wheel 18. A powertrain control module (PCM) 19 adjusts the operating conditions of the engine 12 based on the current vehicle operating conditions and environmental conditions for optimizing the engine output. The engine 12 outputs an engine torque that is transferred to front vehicle wheels 17 and 18 via the transaxle 14. The transaxle 14 distributes engine torque between the front left and front right wheels 17 and 18. This also allows both front wheels 17 and 18 to rotate at different speeds when the vehicle is turning to the right or left. A rear left vehicle wheel 20 and a rear right vehicle wheel 21 are coupled to a rear vehicle axle 22 and are not driven by the engine. The rear vehicle wheels 20 and 21 can rotate independent of one another.

A steering wheel 23 is coupled to a steering column shaft 24 for transferring a steering command input by a driver to a steering linkage assembly 25 for steering the front vehicle wheels 17 and 18. A steering wheel sensing device 26 senses the angle $\theta_{SWA}$ of the steering wheel.

A brake control module 27 includes a plurality of valves (not shown) for applying pressurized hydraulic braking fluid to braking actuators (not shown) disposed on each vehicle wheel 17, 18, 20, 21. Additional valves (not shown) and control modules (not shown) may be utilized for further controlling the flow of pressurized hydraulic braking fluid to a respective vehicle wheel for providing secondary braking operations such as anti-lock braking, traction control, or vehicle stability control. The valves, hydraulic fluid flow paths and actuators for braking systems are well known to those skilled in the art and so will not be discussed in detail herein. Wheel speed sensors 34-37 are disposed at each wheel and may be used to sense the speed of each wheel for providing wheel speed information to the braking control module 27.

Figure 2:
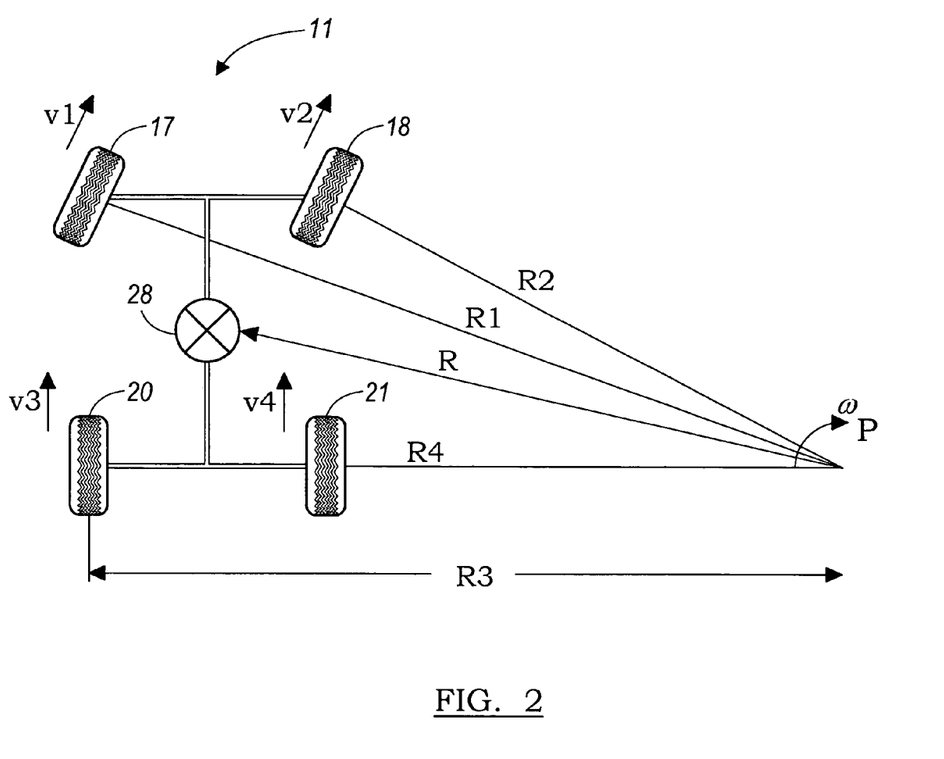
FIG. 2 is a diagram illustrating a turning geometry of a front wheel steerable vehicle according to the first preferred embodiment of the present invention.

FIG. 2 is a diagram illustrating a turning geometry for vehicle 11 having steerable front vehicle wheels 17 and 18 and non-steerable rear wheels 20, 21. The front vehicle wheels 17 and 18 are pivoted at an angle corresponding to the steering wheel angle $\theta_{SWA}$ as input by a driver. A respective line $R_1$, $R_2$, $R_3$, $R_4$ is drawn from the center of each vehicle wheel 17, 18, 20, 21 for establishing a center turning point P. Since, in the example shown in the diagram illustrated of FIG. 2 the vehicle is turning to the right, the front left wheel 17 is also the front outside wheel, the front right wheel 18 is also the front inside wheel, the rear left wheel 20 is also the rear outside wheel, and the rear right wheel 21 is also the rear inside wheel. Of course, if the vehicle were turning to the left, then the inside and outside designations would be reversed. In order to establish the turning point P, Line $R_1$ is drawn perpendicular from the front outside wheel 17 in the direction of the turn, Line $R_2$ is drawn perpendicular from the front inside wheel 18 in the direction of the turn, and lines $R_3$ and $R_4$ are drawn perpendicular from the rear outside wheel 20 and rear inside wheel 21, respectively, in the direction of the turn. Since the rear outside wheel 20 and rear inside wheel 21 are axially aligned and non-steerable, lines $R_3$ and $R_4$ overlap one another. The intersection of lines $R_1$, $R_2$, $R_3$, and $R_4$ define the vehicle center turning point P for the respective steering wheel angle $\theta_{SWA}$. For any given steering wheel angle $\theta_{SWA}$, the vehicle turn radius R is defined by drawing a perpendicular line from a vehicle center midpoint 28 to the center turning point P corresponding to that particular steering wheel angle $\theta_{SWA}$. The vehicle center midpoint 28 is defined as the point located an equal distance between all four wheels 17, 18, 20, 21. To put it another way, the vehicle center midpoint 28 is the diagonal intersection of imaginary lines drawn between the front outside wheel 17 and rear inside wheel 21 and the front inside wheel 18 and rear outside wheel 20. The vehicle will turn about the center turning point P at a radius R.

Figure 3:
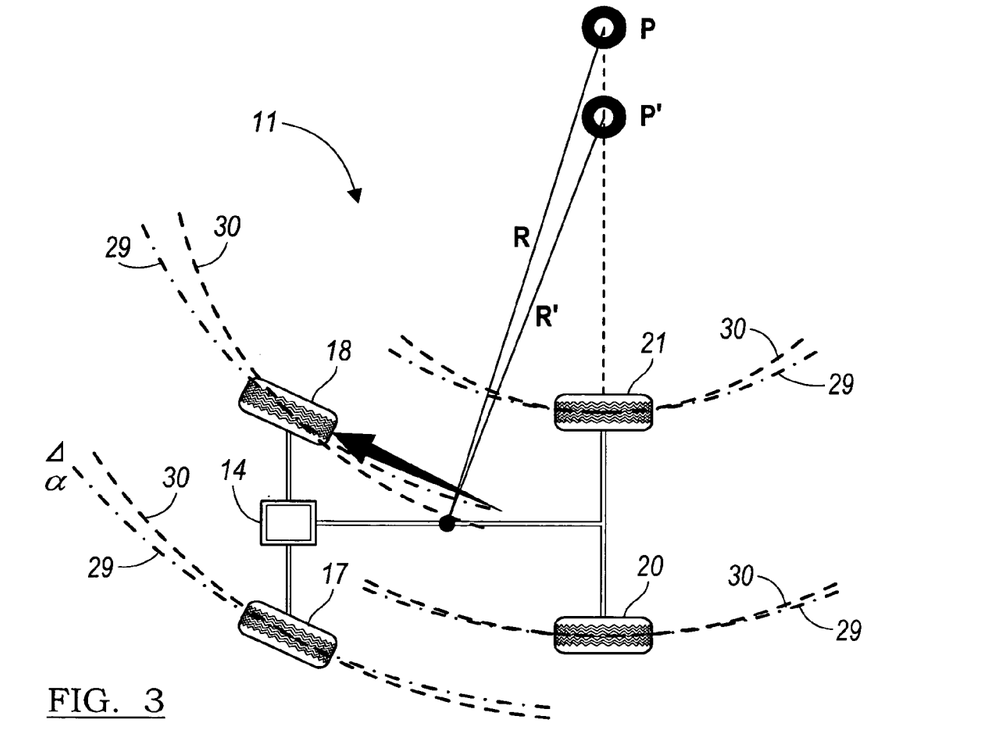
FIG. 3 is a diagram illustrating a turning geometry for an application of brake torque on a front wheel drive vehicle having a reduced turning radius according to the first preferred embodiment of the present invention.
Figure 4:
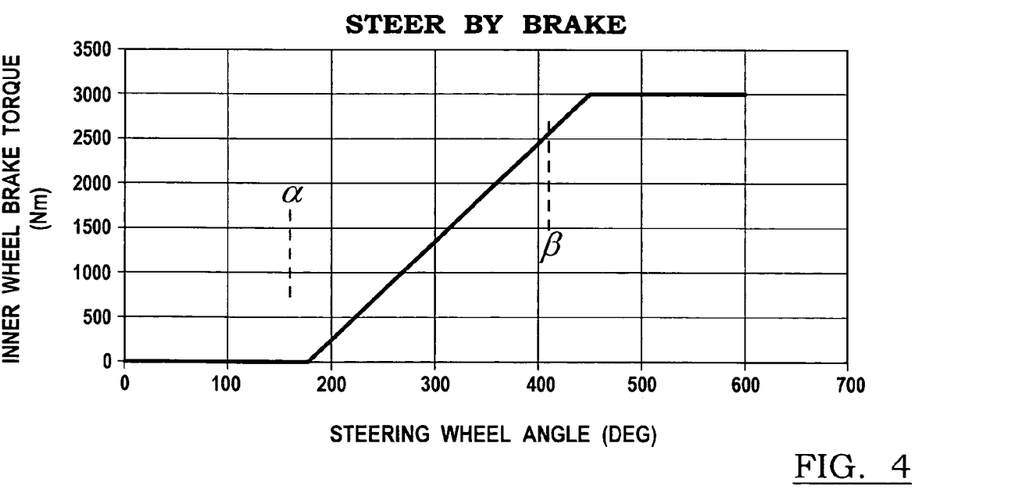
FIG. 4 is a graph correlating braking torques to steering wheel angles for a respective vehicle according to a first preferred embodiment of the present invention.
Figure 5:
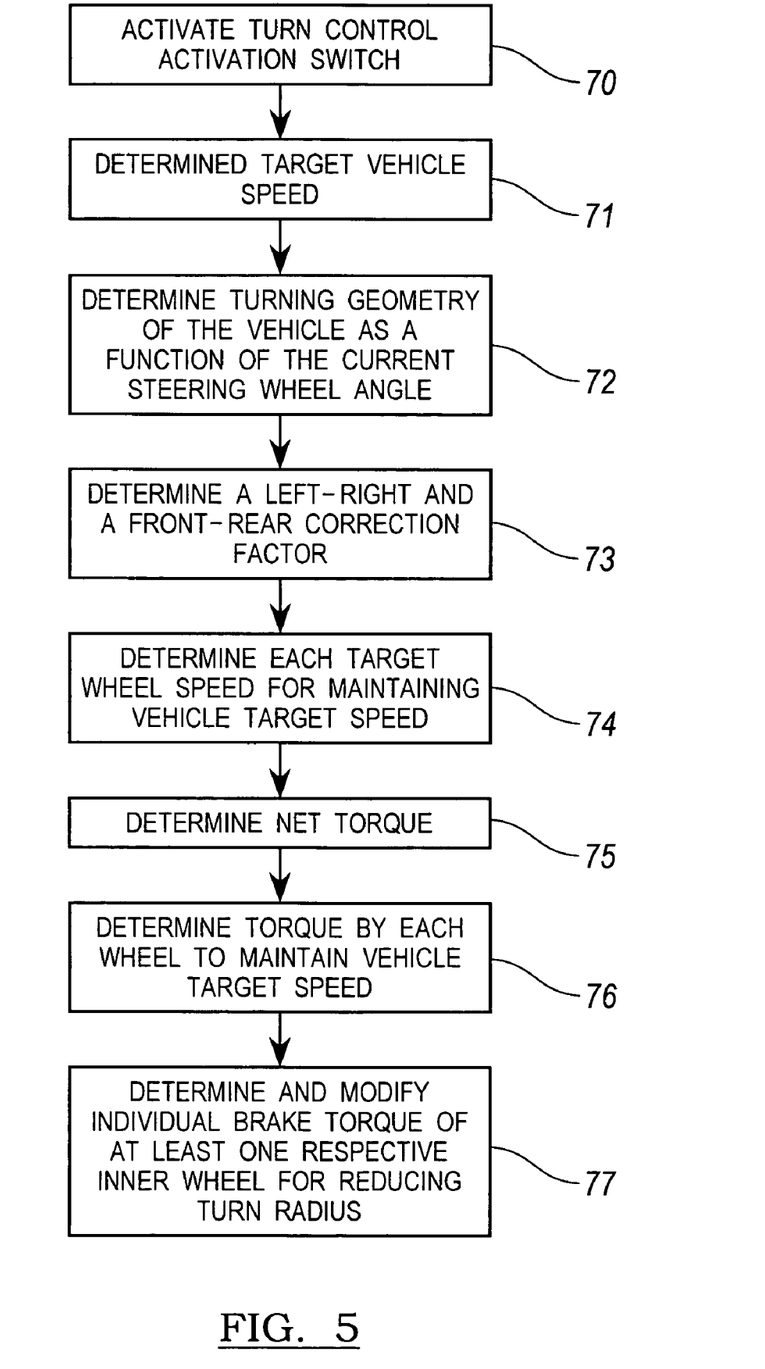
FIG. 5 is a flow chart illustrating a method for reducing a turn radius of a vehicle according to a first preferred embodiment of the present invention.

To reduce the turn radius R of the vehicle 11 for a given steering wheel angle $\theta_{SWA}$, a braking force may be applied to a given wheel or wheels of the vehicle as discussed below. FIGS. 3-5 illustrate three embodiments with different wheel drive systems. For each of these embodiments, a braking force is applied to a different vehicle wheel to best accomplish the turning radius reduction.

FIG. 3 illustrates a diagram showing the turning geometry for a front wheel drive vehicle 11, such as that shown in FIGS. 1 and 2. As discussed above, the vehicle 11 has a turn radius R about a center point P for a particular steering wheel angle $\theta_{SWA}$. Without the special brake force applied, this geometry generates a turning curve path (TCP) 29. An additional braking torque is applied to the front inside wheel 18 as the vehicle travels at a target velocity $v_T$ while at a particular steering wheel angle $\theta_{SWA}$. The amount of additional braking torque applied is a function of the target velocity $v_T$ and the steering wheel angle $\theta_{SWA}$. This additional braking torque applied to the front inside wheel 18 will cause the vehicle turn radius to change from initial turn radius R to brake assisted turn radius R', with a corresponding change in the center turning point from the initial center turning point P to brake assisted turn radius P'. Thus, the turning radius of the vehicle 11 is reduced, even while traveling at the same target velocity $v_T$ and maintaining a same steering wheel angle $\theta_{SWA}$. FIG. 3 shows a resulting turning curve path (TCP'), indicated generally at 30, resulting from the additional braking torque applied to the front inside wheel 18. As can be seen from this new path 30, the turning radius of the vehicle 11 has been improved.

It is desirable that the reduced turn radius R' that is both constant and predicable. In order to achieve the constant reduced turn radius R' by vehicle braking, not only must the additional braking force be applied to the desired wheel, but a constant vehicle speed must be maintained. For a vehicle traveling at a constant angular vehicle target velocity $v_T$, each wheel of the vehicle travels at a different velocity while maintaining the vehicle turn radius R and vehicle target velocity $v_T$. While reducing the turn radius R to the reduced brake radius R', the vehicle target velocity $v_T$ is still maintained but each wheel speed may be adjusted for maintaining the target wheel speed at the reduced turning radius R'. The vehicle target velocity $v_T$ is assumed to be the velocity at the center of the rear axle of the vehicle. A Constant Speed Control (CSC) system may be used for determining the vehicle target velocity $v_T$ and the individual wheel speeds. The vehicle target velocity $v_T$ is based on a driver's accelerator pedal demand which is a function of the accelerator pedal position irregardless of the road surface grade. The CSC determines the vehicle target velocity $v_T$ as a function of the torque demand:

$$v_T = f\{\Theta\} \quad (1)$$

where $\Theta$ is preferably the accelerator pedal position as determined by an accelerator pedal sensor 16 (shown in FIG. 1). In yet another embodiment, the accelerator pedal demand may be determined by the PCM 19 (shown in FIG. 1) if an electronic throttle is utilized. The determination of the vehicle target speed $v_T$ as a function of the torque demand is known to those skilled in the art and so will not be discussed further herein. Each of the calculations for the formulas shown are preferably calculated within the braking control module 27. After the vehicle target velocity $v_T$ is determined, each individual wheel speed target is calculated as a function of the vehicle's turning geometry in relation to the vehicle target speed $v_T$ where:

$$v_{T1}, v_{T2}, v_{T3}, v_{T4} = f\{v_T, \text{turning geometry}\} \quad (2)$$

The vehicle target speed $v_T$ is assumed to be at the center of the rear axle. Once the vehicle target speed $v_T$ is determined, each vehicle wheel speed may be derived from the vehicle target speed $v_T$ using a correction factor. A left to right correction factor $\Delta_{l\_r}$ and a front to rear correction factor $\Delta_{f\_r}$ are based on a steady state turning geometry, steering wheel angle $\theta_{SWA}$, and the vehicle target speed $v_T$ and are used to differentiate the speeds of each wheel. The vehicle wheel speeds are calculated based on the following formulas:

$$v_{T1} = v_T + \frac{\Delta_{l\_r}}{2} + \Delta_{f\_r}, \quad (3)$$

$$v_{T2} = v_T - \frac{\Delta_{l\_r}}{2} + \Delta_{f\_r}, \quad (4)$$

$$v_{T3} = v_T + \frac{\Delta_{l\_r}}{2}, \quad (5)$$

$$v_{T4} = v_T - \frac{\Delta_{l\_r}}{2}, \quad (6)$$

where $v_{T1}$ is a target wheel speed of a front outside tire; where $v_{T2}$ is a target wheel speed of a front inside tire; where $v_{T3}$ is a target wheel speed of a rear outside tire; where $v_{T4}$ is a target wheel speed of a rear inside tire; where $\Delta_{l\_r}$ is a wheel speed difference between an outside and inside wheel of a same axle; and where $\Delta_{f\_r}$ is a wheel speed difference between a front and rear wheel on a same vehicle side.

The vehicle target speed $v_T$ may be controlled by using two separate control devices either in combination or individually. First, vehicle speed may be controlled by reducing the output torque of the engine 12. The PCM 19 may control the engine for altering the engine output torque for controlling the vehicle speed. Secondly, the vehicle speed may be modulated by applying a braking force to each wheel as controlled by the braking control module 27 (shown in FIG. 1). However, most often vehicle target speed $v_T$ may be controlled by utilizing both the PCM 19 in conjunction with the brake control module 27. A net torque $T_{net}$ is determined as the torque error difference for maintaining the constant vehicle speed between the two control devices. The actual average vehicle speed is determined using the data sensed from the wheel sensor 34-37 and is represented by the following formula:

$$(V_1+V_2+V_3+V_4)/4 \quad (7)$$

where $V_1$, $V_2$, $V_3$, and $V_4$ are actual wheel speeds sensed by each wheel sensor.

The average target wheel speed is determined by the following formula:

$$(v_{T1}+v_{T2}+v_{T3}+v_{T4})/4 \quad (8)$$

The resulting output determined by a PID controller is the difference of the average wheel speed and the average target wheel speed. The resulting output is correlated to the torque error difference $T_{net}$ that requires adjustment by the braking force of the vehicle brakes. The torque error difference $T_{net}$ may be represented by the following formula:

$$T_{net}=T_{eng}-T_{brk\_CSC} \quad (9)$$

where $T_{eng}$ is the torque as applied by the engine and $T_{brk\_CSC}$ is the torque as applied by the vehicle brakes to make up the difference. The net torque $T_{net}$ is executed by modulating engine torque and brake torque independent of the driver having to make adjustments between the accelerator pedal and the brake pedal for attaining the vehicle target speed. The brake control model 27 (FIG. 1) outputs a control signal to the PCM 19 to increase or decrease the engine torque as determined by the brake control module 27 in order to maintain the vehicle target speed $v_T$. If reducing the engine torque down to a level that may causes the engine 12 to stall, then the vehicle target speed $v_T$ is achieved by modulating the vehicle wheel brakes. The overall brake torque is then distributed evenly to each vehicle wheel 17, 18, 20, and 21 to maintain vehicle target speed $v_T$. With the vehicle at a vehicle target speed $v_T$ through a curve, the steer by braking algorithm of the brake control module 27 is utilized in cooperation with the CSC for applying braking commands to respective vehicle brakes for reducing the vehicle's turn radius while still maintaining the vehicle target speed $v_T$. Reduced turn radius is beneficial during parallel parking or parking lot maneuvers.

The steering by braking system (SBB) and CSC are actuated in response to a driver activating a low gear activation switch 33 as shown in FIG. 1. This actuation of the low gear activation switch 33 shifts the transmission in a low operating gear such as the vehicle's lowest transmission gear. After for actuation of the low gear activation switch 33, the brake control module 27 activates the CSC for placing the vehicle into a steady state speed. Once the vehicle is at the target vehicle speed, the system determines the brake torque demands that are required for braking the vehicle 11 for reducing the turn radius R to turn radius R'. Braking torque is applied to the appropriate inside wheel(s) relative to the outside wheel(s) on a same axle.

For an all wheel drive system (such as for the third embodiment, as illustrated infra in FIG. 7) making a left turn utilizing SBB and CSC controls, the torque exerted on the each of the vehicle wheels are represented by the following formula:

$$T_1 = \lim(0, x, T_{max}), \text{ where } x = \frac{T_{brk\_CSC} - T_{brk\_SBB}}{4}, \quad (10)$$

$$T_2 = \lim(0, y, T_{max}), \text{ where } y = \frac{T_1 + T_{brk\_SBB}}{2}, \quad (11)$$

$$T_3=T_1, \quad (12)$$

$$T_4=T_2, \quad (13)$$

where $T_1$ is a brake torque request on an outside front wheel, where $T_2$ is a brake torque request on an inside front wheel, where $T_3$ is a brake torque request on an outside rear wheel, where $T_4$ is a brake torque request on an inside rear wheel, where $T_{max}$ a maximum braking torque achievable on each vehicle wheel, where $T_{brk\_SBB}$ is an available braking torque for a respective steering wheel angle, and where $T_{brk\_CSC}$ is a total braking torque for maintaining a constant target vehicle speed.

FIG. 4 illustrates a graph for a respective vehicle for applying a braking torque $T_{brk\_SBB}$ to a respective inner wheel of a vehicle that is determined by the steering wheel angle $\theta_{SWA}$. The graph shown in FIG. 4 is represented by the following conditions:

If $0° \leq \theta_{SWA} \leq \alpha$ then $T_{brk\_SBB}=0$, \quad (14)

If $\alpha \leq \theta_{SWA} \leq \beta$ then $T_{brk\_SBB}=T_{max}*[(\theta_{SWA}-\alpha)/(\beta-\alpha)]$, \quad (15)

If $\beta \leq \theta_{SWA}$ then $T_{brk\_SBB}=T_{max}$ \quad (16)

Different SBB graphs illustrating steering wheel angle vs. inner wheel braking torque may be used for different vehicles.

FIG. 5 illustrates a method for reducing the turn radius of a vehicle while maintaining a constant vehicle speed. In step 70 a low gear activation switch is actuated. The low gear includes a low forward drive gear and a reverse gear. The low gear activation switch initiates the CSC algorithm and the SBB algorithm. In step 71, a target vehicle speed is determined based on the position of the throttle 16. In step 72, turning geometry of a vehicle is determined based on the degree of rotation of the steering wheel. In step 73, a right-left correction factor and a front-rear correction factor is determined based on a vehicle target speed assumed at the center of the rear axle. In step 74, each target wheel speed is determined as a function of the vehicle target speed and the correction factors.

In step 75, an output difference is calculated as a result of the difference of the average actual wheel speeds and the average target wheel speeds. The output difference is correlated to a net torque by a PID controller. In step 76, a vehicle brake torque is determined for maintaining the target vehicle speed based on the product difference between the net torque and the engine output torque available to reduce engine speed without stalling the engine. The vehicle brake torque is evenly distributed to all wheels. In step 77, the vehicle brake torque is used to calculate the individual brake torques applied to each respective wheel for reducing the turn radius based on the input steering wheel angle and the vehicle maintaining a vehicle target torque.

Figure 6:
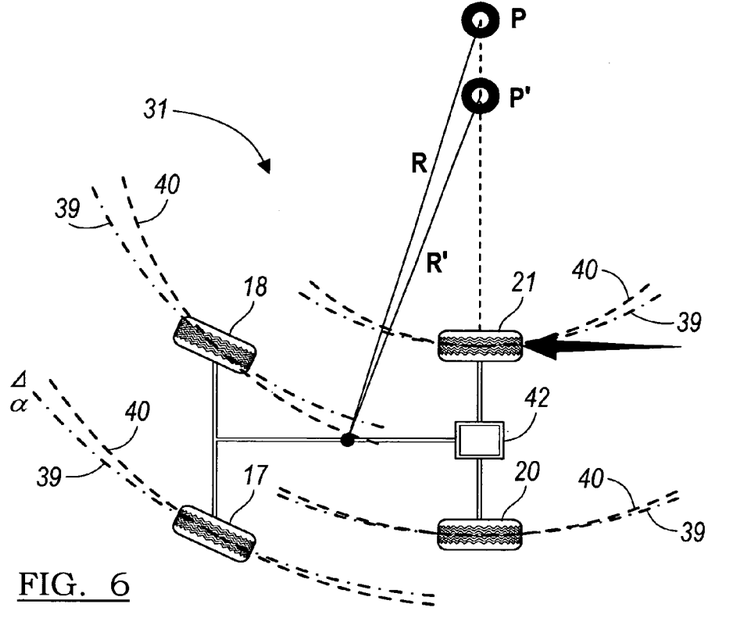
FIG. 6 is a diagram illustrating a turning geometry for an application of brake torque on a rear wheel drive vehicle having a reduced turning radius according to a second preferred embodiment of the present invention.

FIG. 6 illustrates a diagram showing the turning geometry for a rear wheel drive vehicle 31 according to the second embodiment of the present invention. As discussed above, the vehicle 11 has a turn radius R about a center point P for a particular steering wheel angle $\theta_{SWA}$ without special brake force applied, this geometry that generates a TCP 39. An additional braking torque is applied to the front inside wheel 21 as the vehicle travels at a vehicle target velocity $v_T$ while at a particular steering wheel angle $\theta_{SWA}$. The amount of additional braking torque applied is a function of the vehicle target velocity $v_T$ and the steering wheel angle $\theta_{SWA}$. This additional braking torque applied to the rear inside wheel 21 will cause the vehicle to change from an initial turn radius R changes to a brake assisted turn radius R' with a corresponding change in the center turning point from the initial turning center point P to brake assisted turn radius point P'. The turning radius of the vehicle 31 is reduced, even while traveling at the target velocity $v_T$ and maintaining a same steering wheel angle $\theta_{SWA}$. FIG. 4 shows a resulting turning curve path TCP', indicated generally at 40, resulting from additional braking torque applied to the rear inside wheel 21. As can be seen from this new path 40, the turning radius of the vehicle 31 has been improved.

Figure 7:
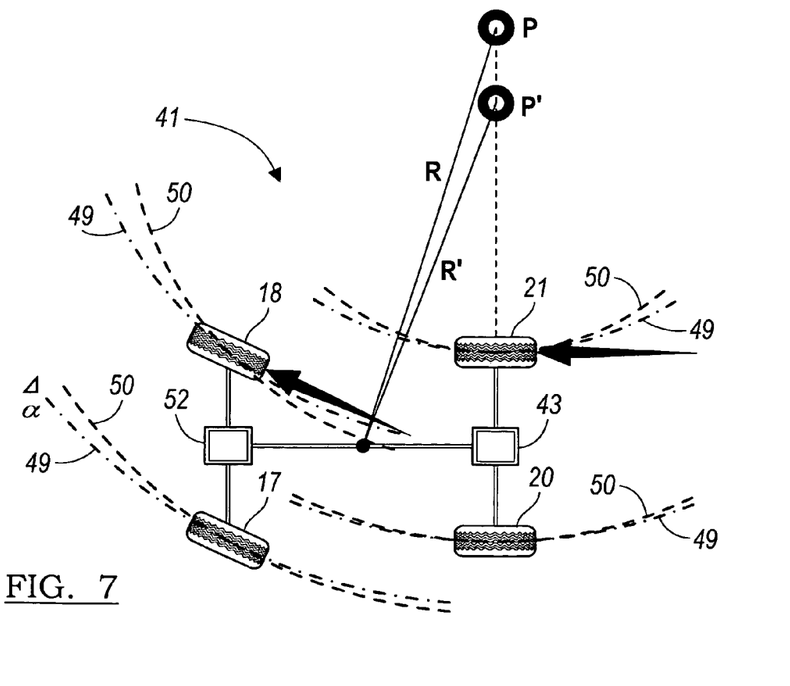
FIG. 7 is a diagram illustrating a turning geometry for an application of brake torque on an all wheel drive vehicle having a reduced turning radius according to a third preferred embodiment of the present invention.

FIG. 7 illustrates a diagram showing the turning geometry for an all wheel drive vehicle 41 according to a third embodiment of the present invention. As discussed above, the vehicle 41 has a turn radius R about a center point P for a particular steering wheel angle $\theta_{SWA}$ without special brake force applied, this geometry that generates a TCP 49. An all wheel drive vehicle 41 having open differentials 42 and 43 has an additional braking torque applied to the front inside wheel 18 and the rear inside wheel 21 as the vehicle travels at a target velocity $v_T$ while at a particular steering wheel angle $\theta_{SWA}$. The amount of additional braking torque applied is a function of the vehicle target velocity $v_T$ and the steering wheel angle $\theta_{SWA}$. This additional braking torque applied to the front inside wheel 21 and the rear inside wheel 21 will cause the vehicle to change from an initial turn radius R changes to a brake assisted turn radius R' with a corresponding change in the center turning point from the initial turning center point P to brake assisted turn radius point P'. The turning radius of the vehicle 41 is reduced, even while traveling at the target velocity $v_T$ and maintaining a same steering wheel angle $\theta_{SWA}$. FIG. 5 shows a resulting turning curve path TCP', indicated generally at 50, resulting from additional braking torque applied to the front inside wheel 18 rear inside wheel 21. As can be seen from this new path 50, the turning radius of the vehicle 41 has been improved.

Alternatively the brake apply strategy for each of the embodiments shown in FIG. 3, FIG. 6, and FIG. 7, is not limited to only those brake apply strategies as shown in the various embodiments but may be used interchangeably. That is, the brake apply strategy to a specific inside wheel or both inside wheels may be used on any respective drive vehicle regardless of whether the respective vehicle is a front, rear, or all-wheel drive. For example, a front wheel drive vehicle as shown in FIG. 3 is not limited to the brake apply strategy to only the front inside wheel, rather, brake apply strategy may be applied to both the front and rear inside wheels. Similarly, for an all wheel drive vehicle, the brake apply strategy may be applied to only a single inside wheel.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A turn control system for a vehicle having four wheels and a steering wheel that controls the steering of two of the wheels, the system comprising:
    a brake system having four brakes with each of said brakes capable of applying an individual brake torque to a respective one of said four wheels;
    a steering wheel angle sensor for sensing an angle of rotation of said steering wheel;
    an acceleration sensing device for sensing an acceleration demand;
    a wheel speed sensing device for sensing a wheel speed for each of the four wheels;
    a turn control activation switch for enabling said turn control system and for shifting a vehicle transmission to one of a low or reverse operating gear; and
    a brake control module for calculating a target vehicle speed in response to said acceleration demand; a vehicle turning geometry in response to an angle of the steering wheel; and target wheel speeds for each of said wheels in response to said target vehicle speed and said vehicle turning geometry; and for generating a braking torque command signal for modulating said brake torque on said four brakes and generating an engine torque command signal for modulating an engine torque for producing said target vehicle speed, and applying a respective additional braking torque to at least one of the brakes for reducing said vehicle turning radius while maintaining said vehicle target speed.

2. The turn control system of claim 1 wherein said turn control system is activated in response to an actuation of the said turn control activation switch and said steering wheel angle exceeding a predetermined threshold.

3. The turn control system of claim 1 wherein said target wheel speeds for each of said four wheels includes a front outside target wheel speed $v_{T1}$, a front inside target wheel speed $v_{T2}$, a rear outside target wheel speed $v_{T3}$, and a rear inside target wheel speed $v_{T4}$, and wherein each of the said target wheel speeds as calculated by the brake control module are determined by the formulas;

$$v_{T1} = v_T + \frac{\Delta_{l\_r}}{2} + \Delta_{f\_r}, \; v_{T2} = v_T - \frac{\Delta_{l\_r}}{2} + \Delta_{f\_r}, \; v_{T3} = v_T + \frac{\Delta_{l\_r}}{2},$$

$$v_{T4} = v_T - \frac{\Delta_{l\_r}}{2},$$

where $v_T$ is a target vehicle speed $\Delta_{l\_r}$ is a wheel speed difference between an outside and inside wheel of a same axle, and $\Delta_{f\_r}$ is a wheel speed difference between a front and rear wheel on a same vehicle side.

4. The system of claim 1 wherein said braking torque applied to at least one vehicle wheel includes a front outside wheel brake torque request $T_1$, a front inside wheel brake torque request $T_2$, a rear outside wheel brake torque request $T_3$, and a rear inside wheel brake torque request $T_4$, and wherein each of the said brake torque requests as calculated by the brake control module are determined by the formulas:

$$T_1 = \lim(0, x, T_{max}), \text{ where } x = \frac{T_{brk\_CSC} - T_{brk\_SBB}}{4},$$

$$T_2 = \lim(0, y, T_{max}), \text{ where } y = \frac{T_1 + T_{brk\_SBB}}{2},$$

$T_3 = T_1$, $T_4 = T_2$, where $T_{max}$ is a maximum braking torque achievable on each vehicle wheel, $T_{brk\_SBB}$ is an available braking torque for a respective steering wheel angle, and $T_{brk\_CSC}$ is a total braking torque for maintaining a constant target vehicle speed.

5. The turn control system of claim 1 wherein said brake control module includes a PID controller for calculating a net torque in response to said wheel speeds and said target wheel speeds for maintaining the constant target vehicle speed.

6. The turn control system of claim 1 further comprising a powertrain control module for controlling said engine torque in response to said engine torque command signal from said brake control module.

7. The turn control system of claim 1 wherein said acceleration sensing device includes an accelerator pedal position sensor for sensing a position of an accelerator pedal.

8. The turn control system of claim 1 wherein said acceleration sensing device includes a throttle position sensor for sensing a position of a throttle valve.

9. The turn control system of claim 1 wherein said acceleration sensing device includes a powertrain control module for providing a position of an electronic throttle control valve.

10. A method for controlling a turn radius of a vehicle having four wheels and four brakes, with each brake capable of applying a braking torque to a respective one of the four wheels, the method comprising the steps of:
   determining a vehicle turning geometry in response to a steering wheel angle and a measured vehicle speed;
   calculating a target vehicle speed in response to an acceleration pedal demand;
   calculating a target wheel speed of each of said four wheels as a function of said target vehicle speed;
   determining an engine output torque and a total vehicle braking torque for cooperatively maintaining said vehicle at said target vehicle speed;
   modulating said engine output torque and said total vehicle braking torque for cooperatively maintaining said target vehicle speed; and
   modifying said braking torque applied to at least one of the wheels for reducing said turn radius of said vehicle while maintaining said target vehicle speed.

11. The method of claim 10 wherein said step of calculating a target wheel speed for each of said wheels includes a front outside target wheel speed $v_{T1}$, a front inside target wheel speed $v_{T2}$, a rear outside target wheel speed $v_{T3}$, and a rear inside target wheel speed $v_{T4}$, and wherein each of the said target wheel speeds are determined by the formulas:

$$v_{T1} = v_T + \frac{\Delta_{l\_r}}{2} + \Delta_{f\_r}, \; v_{T2} = v_T - \frac{\Delta_{l\_r}}{2} + \Delta_{f\_r} \; v_{T3} = v_T + \frac{\Delta_{l\_r}}{2},$$

$$v_{T4} = v_T - \frac{\Delta_{l\_r}}{2},$$

where $v_T$ is a target vehicle speed, $\Delta_{l\_r}$ is a wheel speed difference between an outside and inside wheel of a same axle, and $\Delta_{f\_r}$ is a wheel speed difference between a front and rear wheel on a same vehicle side.

12. The method of claim 10 wherein braking torque applied to at least one vehicle wheel includes a front outside wheel brake torque request $T_1$, a front inside wheel brake torque request $T_2$, a rear outside wheel brake torque request $T_3$, and a rear inside wheel brake torque request $T_4$, and wherein each of the said brake torque requests are determined by the formulas:

$$T_1 = \lim(0, x, T_{max}), \text{ where } x = \frac{T_{brk\_CSC} - T_{brk\_SBB}}{4},$$

$$T_2 = \lim(0, y, T_{max}), \text{ where } y = \frac{T_1 + T_{brk\_SBB}}{2},$$

$T_3 = T_1$, $T_4 = T_2$, where $T_{max}$ is a maximum braking torque achievable on each vehicle wheel, $T_{brk\_SBB}$ is an available braking torque for a respective steering wheel angle, and $T_{brk\_CSC}$ is a total braking torque for maintaining a constant target vehicle speed.

13. The method of claim 10 further including the step of actuating a turn control activation switch for enabling a turn control system.

14. The method of claim 10 wherein said engine output torque and said total vehicle braking torque for maintaining said constant target vehicle speed are determined by a brake control module.

15. The method of claim 14 wherein said engine output torque is modulated by a powertrain control module in response to an engine torque command signal received from said brake control module.

16. The method of claim 14 wherein said braking torque applied to at least one of the wheels is controlled by said braking control module.

17. A method for controlling a turn radius of a vehicle having four wheels and four brakes, with each brake capable of applying a braking torque to a respective one of the four wheels, the method comprising the steps of:
   shifting a transmission of a vehicle into a low gear;

sensing a steering wheel angle of a vehicle;
sensing an acceleration pedal demand;
sensing a wheel speed of each of said wheels;
determining a target vehicle speed in response to said acceleration pedal demand;
determining a turning geometry in response to said steering wheel angle;
calculating target wheel speeds for each of said wheels in response to said target vehicle speed and said turning geometry;

determining an engine torque and a total vehicle braking torque for cooperatively maintaining a constant vehicle speed in response to said vehicle wheel speeds and said actual vehicle wheel speeds; and modifying said braking torque to at least one vehicle wheel for reducing a vehicle turning radius while maintaining said vehicle target speed.

* * * * *